(12) United States Patent
Teramoto et al.

(10) Patent No.: US 10,844,920 B2
(45) Date of Patent: Nov. 24, 2020

(54) SPRING STEEL WIRE AND SPRING

(71) Applicant: NIPPON STEEL & SUMITOMO METAL CORPORATION, Tokyo (JP)

(72) Inventors: Shinya Teramoto, Tokyo (JP); Hiroshi Yarita, Narashino (JP); Shouichi Suzuki, Narashino (JP)

(73) Assignee: NIPPON STEEL CORPORATION, Tokyo (JP)

(*) Notice: Subject to any disclaimer, the term of this patent is extended or adjusted under 35 U.S.C. 154(b) by 194 days.

(21) Appl. No.: 15/755,961

(22) PCT Filed: Sep. 5, 2016

(86) PCT No.: PCT/JP2016/075961
§ 371 (c)(1),
(2) Date: Feb. 27, 2018

(87) PCT Pub. No.: WO2017/039012
PCT Pub. Date: Mar. 9, 2017

(65) Prior Publication Data
US 2018/0259022 A1  Sep. 13, 2018

(30) Foreign Application Priority Data

Sep. 4, 2015  (JP) .................................. 2015-174730

(51) Int. Cl.
*C21D 9/02* (2006.01)
*F16F 1/02* (2006.01)
(Continued)

(52) U.S. Cl.
CPC .................. *F16F 1/02* (2013.01); *C21D 1/25* (2013.01); *C21D 1/48* (2013.01); *C21D 6/002* (2013.01);
(Continued)

(58) Field of Classification Search
CPC ................ C21D 1/25; C21D 2211/004; C21D 2211/008; C21D 6/002; C21D 6/008;
(Continued)

(56) References Cited

U.S. PATENT DOCUMENTS 5,897,717 A   4/1999  Hashimura et al.
2006/0108027 A1   5/2006  Sugimura et al.
(Continued)

FOREIGN PATENT DOCUMENTS

CN   102301024 A   12/2011
EP      2058411 A1    5/2009
(Continued)

OTHER PUBLICATIONS

NPL: JP 2004143482 A, on-line English Translation, May 2004 (Year: 2004).*

(Continued)

*Primary Examiner* — Jie Yang
(74) *Attorney, Agent, or Firm* — Birch, Stewart, Kolasch & Birch, LLP (57) ABSTRACT

A spring steel wire includes, by mass %, C: 0.40% to 0.75%, Si: 1.00% to 5.00%, Mn: 0.20% to 2.00%, P: 0.0001% to 0.0500%, S: 0.0001% to 0.0500%, Cr: 0.50% to 3.50%, Al: 0.0005% to 0.0500%, N: 0.0020% to 0.0100%, Mo: 0% to 2.00%, V: 0% to 0.50%, W: 0% to 0.50%, Nb: 0% to 0.100%, Ti: 0% to 0.100%, Ca: 0% to 0.0100%, Mg: 0% to 0.0100%, Zr: 0% to 0.1000%, B: 0% to 0.0100%, Cu: 0% to 1.00%, Ni: 0% to 3.00%, and a remainder consisting of Fe and impurities. A structure includes, by area radio, tempered martensite of 90% or more. The prior austenite grain size number is No. 12.5 or higher. The presence density of iron-based carbide having an equivalent circle diameter ranging from 0.15 μm to 0.50 μm ranges from 0.40 pieces/μm² to 2.00 pieces/μm².

8 Claims, 1 Drawing Sheet (51) Int. Cl.

| | |
|---|---|
| *C22C 38/06* | (2006.01) |
| *C21D 8/06* | (2006.01) |
| *C22C 38/26* | (2006.01) |
| *C22C 38/20* | (2006.01) |
| *C21D 1/48* | (2006.01) |
| *C21D 6/00* | (2006.01) |
| *C22C 38/02* | (2006.01) |
| *C22C 38/34* | (2006.01) |
| *C22C 38/00* | (2006.01) |
| *C21D 9/52* | (2006.01) |
| *C22C 38/22* | (2006.01) |
| *C22C 38/28* | (2006.01) |
| *C22C 38/04* | (2006.01) |
| *C21D 1/25* | (2006.01) |
| *C22C 38/18* | (2006.01) |
| *C22C 38/24* | (2006.01) |
| *C22C 38/32* | (2006.01) |
| *C22C 38/60* | (2006.01) |

(52) U.S. Cl.
CPC ............ *C21D 6/008* (2013.01); *C21D 8/065* (2013.01); *C21D 9/02* (2013.01); *C21D 9/525* (2013.01); *C22C 38/001* (2013.01); *C22C 38/002* (2013.01); *C22C 38/02* (2013.01); *C22C 38/04* (2013.01); *C22C 38/06* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/34* (2013.01); *C22C 38/60* (2013.01); *C21D 9/52* (2013.01); *C21D 2211/004* (2013.01); *C21D 2211/008* (2013.01)

(58) Field of Classification Search
CPC . C21D 8/065; C21D 9/02; C21D 9/52; C21D 9/525; C22C 38/001; C22C 38/02; C22C 38/04; C22C 38/18; F16F 1/02
USPC ........................................................ 148/328
See application file for complete search history.

(56) References Cited

U.S. PATENT DOCUMENTS

| | | |
|---|---|---|
| 2008/0271824 A1 | 11/2008 | Fujino et al. |
| 2010/0028196 A1* | 2/2010 | Hashimura ............. C22C 38/02 |
| | | 420/84 |
| 2012/0125489 A1 | 5/2012 | Hashimura et al. |

FOREIGN PATENT DOCUMENTS

| | | | |
|---|---|---|---|
| JP | 2-57637 | A | 2/1990 |
| JP | 2613601 | B2 | 5/1997 |
| JP | 10-251804 | A | 9/1998 |
| JP | 11-246943 | A | 9/1999 |
| JP | 3233188 | B2 | 11/2001 |
| JP | 2003-213372 | A | 7/2003 |
| JP | 2004-143482 | A | 5/2004 |
| JP | 2004143482 | A * | 5/2004 |
| JP | 2005-220392 | A | 8/2005 |
| JP | 3764715 | B2 | 4/2006 |
| JP | 2006-144105 | A | 6/2006 |
| JP | 2006-183137 | A | 7/2006 |
| JP | 3851095 | B2 | 11/2006 |
| JP | 3971571 | B2 | 9/2007 |
| JP | 2011-214118 | A | 10/2011 |
| JP | 4868935 | B2 | 2/2012 |
| WO | WO 2008/156295 | A2 | 12/2008 |
| WO | WO 2011/004913 | A1 | 1/2011 |

OTHER PUBLICATIONS

Korean Office Action, dated Jun. 7, 2019, for counterpart Korean Application No. 10-2018-7008582, with an English translation.
Chinese Office Action and Search Report, dated Jul. 23, 2019, for Chinese Application No. 201680050894.2, with a partial English translation.
International Search Report for PCT/JP2016/075961 dated Dec. 6, 2016.
Written Opinion of the International Searching Authority for PCT/JP2016/075961 (PCT/ISA/237) dated Dec. 6, 2016.
Extended European Search Report dated Apr. 5, 2019 for Counterpart European Application No. 16842041.2.
Korean Notice of Allowance dated Mar. 17, 2020, for counterpart Korean Application No. 10-2018-7008582, with English translation.

* cited by examiner

SPRING STEEL WIRE AND SPRING

TECHNICAL FIELD OF THE INVENTION

The present invention relates to a spring steel wire used for high strength springs such as valve springs, clutch damper springs, and suspension springs which are mainly used for automobiles, and particularly relates to a high strength spring steel wire having excellent settling resistance after coiliing, and a spring including the steel wire.

Priority is claimed on Japanese Patent Application No. 2015-174730, filed on Sep. 4, 2015, the content of which is incorporated herein by reference.

RELATED ART

As automobiles progress in weight reduction and high performance, increase of design stress for springs used for various purposes as described above are also aimed at. In this case, since spring load stress increases, springs having excellent fatigue strength and settling resistance is required. Settling denotes plastic deformation under a stress load. Therefore, in a case where the settling resistance is low there is a problem that the settling amount of a spring increases under a high-stress load and restoring force of the spring is degraded.

As the springs used for various purposes as described above, cold formed springs are mainly employed. The cold formed springs are manufactured by carrying out cold coiliing with high strength steel wires in which steel has been subjected to quenching and tempering in advance. Generally, as a technique of improving fatigue strength and settling resistance of such springs, the measure, in which tensile strength after quenching and tempering is enhanced, is well known.

In addition, as disclosed in Patent Documents 1 and 2, technologies of improving fatigue strength and settling resistance have been proposed. In the technologies, tensile strength of a steel wire is enhanced by containing a large amount of an alloying element as a chemical composition such as Si. However, when tensile strength of a steel wire is enhanced using such a technique, there is concern that ductility and toughness are remarkably degraded such that coiliing cannot be carried out, or an obtained spring cannot bear use as a spring.

In addition to that described above, in the related art, various techniques of improving settling resistance have been proposed. For example, Patent Document 3 proposes a technology of improving settling resistance of a spring by causing fine cementite of 100 nm or smaller to be dispersed in steel. However, in Patent Document 3, in order to restrain this fine cementite from decomposing and dissipating during heat treatment, there is a need to cause Cr and V to be concentrated in the cementite such that the concentration of Cr and the concentration of V reach a predetermined concentration or higher. The fine cementite in which alloying elements such as Cr and V are concentrated has remarkably low ductility and toughness. Therefore, in the technology of Patent Document 3, there is concern that coiliing for obtaining a spring from a steel wire cannot be carried out, or an obtained spring cannot bear use as a spring.

In addition Patent Document 4 has proposed a technology of improving settling resistance of a suspension spring. In the technology, steel mainly including a structure of martensite and bainite is subjected to cold working. Thereafter, quenching and tempering are performed. Then, prior austenite grains are refined, an undissolved carbide is reduced as much as possible. However, in the technology of Patent Document 4, there is a need to carry out cold working for spring steel mainly including the structure of martensite and bainite. The structure of martensite and bainite in high carbon steel such as spring steel is brittle so that it is difficult to carry out cold working.

Furthermore, Patent Documents 5 to 8 have also proposed technologies of improving fatigue properties or settling resistance by reducing the amount of undissolved carbide (cementite). However, in such technologies, the effect of improving fatigue properties or settling resistance is small.

As described above, the technologies of improving settling resistance which have been proposed in the related art are still insufficient and high strength spring steel wires which can cope with recent demands for high strengthening of springs and can improve settling resistance of springs have not been realized at present.

PRIOR ART DOCUMENT

Patent Document

[Patent Document 1] Japanese Patent No. 2613601
[Patent Document 2] Japanese Unexamined Patent Application, First Publication No. H2-57637
[Patent Document 3] Japanese Patent No. 4868935
[Patent Document 4] Japanese Patent No. 3764715
[Patent Document 5] Japanese Patent No. 3233188
[Patent Document 6] Japanese Unexamined Patent Application, First Publication No. H11-246943
[Patent Document 7] Japanese Patent No. 3971571
[Patent Document 8] Japanese Patent No. 3851095

DISCLOSURE OF THE INVENTION

Problems to be Solved by the Invention

The present invention has been made based on the foregoing circumstances. An object of the present invention is to provide a high strength spring steel wire which has favorable workability, in which the amount of plastic deformation is small even when being used under a high-stress load after coiliing, and which has excellent settling resistance to the extent of being able to sufficiently cope with recent demands for high strengthening, and a spring including the spring steel wire.

Means for Solving the Problem

In order to achieve the object, the inventors have intensively examined measures for realizing a high strength spring steel wire having excellent settling resistance after coiliing. The following (a) to (e) are results of the acquired knowledge.

(a) In order to improve settling resistance, it is effective to cause the structure of a spring steel wire (metallographic structure) to be a structure having tempered martensite as a main constituent (specifically, a structure, by area ratio, having tempered martensite of 90% or more), and at the same time to refine the structure, particularly to refine prior austenite grains. Generally, in a process of manufacturing a spring steel wire, pearlitic transformation treatment such as lead patenting is performed with respect to steel having, a structure including austenite after hot rolling. Thereafter, cold wire-drawing is performed, and then quenching and tempering are performed. If the structure after quenching and tempering is a structure having, tempered martensite as a main constituent, particularly, a structure, by area ratio, having tempered martensite of 90% or more, excellent settling resistance can be ensured.

(b) In order to improve settling resistance, it is effective to refine the structure, particularly to refine; prior austenite grains. If austenite grains before transformation are refined the size of martensite blocks in a structure having tempered martensite as a main constituent is refined. In addition, due to the refined martensite block size, yield strength is improved and settling resistance is improved. These effects are particularly maximized when the size of prior austenite grains matches that of No. 12.5 or higher in the grain size numbers regulated by JIS G 0551.

(c) In order to achieve refinement of prior austenite grains, it is effective to cause a large amount of iron-based carbide represented by cementite ($Fe_3C$), particularly comparatively large iron-based carbide (iron-based carbide having undissolved iron-based carbide as a main constituent, as described below) having a grain size of a certain degree or larger to be dispersed. In, the related art, it has been considered that it is favorable to have no coarse carbide. However, when a large amount of comparatively large iron-based carbide is dispersed, austenite grains before transformation can be refined due to the pinning effect of the iron-based carbide. When the austenite grains before transformation are refined, martensite, which has been formed by transformation in a cooling process thereafter, is refined, so that yield strength is improved, without having workability degraded. Therefore, settling resistance is improved.

(d) In the iron-based carbide described above, its grain size is important. It is difficult to sufficiently exhibit the effects described above in fine iron-based carbide having an equivalent circle diameter less than 0.15 μm and coarse iron-based carbide having an equivalent circle diameter exceeding 0.50 μm. Therefore, in order to achieve the effect, there is a need to cause a predetermined amount or more of iron-based carbide having an equivalent circle diameter ranging from 0.15 μm to 0.50 μm to be present. In the process of manufacturing a spring steel wire, there are cases where a part of carbide such as cementite generated through pearlitic transformation treatment such as lead patenting after hot rolling remains undissolved without being completely dissolved even after quenching and tempering thereafter. Such undissolved iron-based carbide is often present as carbide having an equivalent circle diameter of approximately 0.15 μm or larger. Meanwhile, iron-based carbide is precipitated even during tempering after quenching. However, carbide which is precipitated during tempering is fine, and the equivalent circle diameter is less than 0.15 μm, particularly, the equivalent circle diameter is mostly less than 0.10 μm. Therefore, in order to refine austenite grains before transformation and to improve settling, resistance, it is effective to utilize iron-based carbide which remains undissolved even after quenching and tempering.

(e) In order to improve settling resistance, controlling the presence density of iron-based carbide is also important. That is, if an amount of iron-based undissolved carbide having an equivalent circle diameter ranging from 0.15 μm to 0.50 μm is small, since the effect of refining grains is not sufficient, settling resistance is not improved. Particularly, when its presence density is less than 0.40 pieces/μm$^2$, the effect of improving settling resistance is scarcely recognized. Meanwhile, in a case where iron-based carbide having an equivalent circle diameter ranging from 0.15 μm to 0.50 μm is excessively present, since strength after quenching and tempering is degraded, settling resistance is degraded, on the contrary. In addition, in this case, since ductility is also degraded, workability is remarkably degraded. Particularly, when its presence density exceeds 2.00 pieces/μm, these problems are likely to occur. Therefore, in order to reliably improve settling resistance without impairing workability, the presence density of iron-based carbide having an equivalent circle diameter ranging from 0.15 μm to 0.50 μm needs to be within a range of 0.40 pieces/μm$^2$ to 2.00 pieces/μm$^2$.

Based on the knowledge described above as in (a) to (e), the inventors have found that settling resistance after coiling can be reliably and sufficiently improved without impairing workability, when a structure of a steel wire includes, by area ratio, tempered martensite of 90% or more, when at the same time, the prior austenite grain size number is No. 12.5 or higher, and when furthermore, the presence density of iron-based carbide having an equivalent circle diameter ranging from 0.15 μm to 0.50 μm ranges from 0.40 pieces/μm$^2$ to 2.00 pieces/μm$^2$, and have attained the present invention.

The gist of the present invention is as follows.

(1) According to an aspect of the present invention, there is provided a spring steel wire including, by mass % C: 0.40% to 0.75%, Si: 1.00% to 5.00%, Mn: 0.20% to 2.00%, P: 0.0001% to 0.0500%, S: 0.0001% to 0.0500%, Cr: 0.50% to 3.50%, Al: 0.0005% to 0.0500%, N: 0.0020% to 0.0100%, Mo: 0% to 2.00%, V: 0% to 0.50%, W: 0% to 0.50%, Nb: 0% to 0.100%. Ti: 0% to 0.100%, Ca: 0% to 0.0100% Mg: 0% to 0.0100%, Zr: 0% to 0.1000%, B: 0% to 0.0100%, Cu: 0% to 1.00%, Ni: 0% to 100%, and a remainder of Fe and impurities. A structure includes, by area ratio, a tempered martensite of 90% or more. The prior austenite grain size number is No. 12.5 or higher. The presence density of iron-based carbide having an equivalent circle diameter ranging from 0.15 μm to 0.50 μm is 0.40 pieces/μm$^2$ to 2.00 pieces/μm$^2$.

(2) In the spring steel wire according to (1), the spring steel wire may include, by mass %, at least one of Mo: 0.01% to 2.00%. V: 0.01% to 0.50%, W: 0.01% to 0.50%, Nb: 0.005% to 0.100%, and Ti: 0.001% to 0.100%.

(3) In the spring steel wire according to (1) or (2) the spring steel wire may include, by mass %, at least one of Ca: 0.0002% to 0.0100%, Mg: 0.0002% to 0.0100%. Zr: 0.0005% to 0.1000%, B: 0.0005% to 0.0100%, Cu: 0.05% to 1.00%, and Ni: 0.05% to 100%.

(4) According to another aspect of the present invention, there is provided a spring including the spring steel wire according to any one of (1) to (3).

Effects of the Invention

According to the present invention, it is possible to provide a high strength spring steel wire having excellent settling resistance after coiliing while favorable workability is ensured, and a spring including the spring steel wire.

EMBODIMENT OF THE INVENTION

Hereinafter, a spring steel wire according to an embodiment of the present invention (hereinafter, a spring steel wire according to the present embodiment) and a spring according to, an embodiment of the present invention (hereinafter, according to a spring of the present embodiment) will be described.

<Chemical Composition>

First, the reasons for limiting the chemical composition of the spring steel wire in the present invention will be described. Hereinafter, the percentage sign "%" of the amount of each component indicates "mass %".

C: 0.40% to 0.75%

C is an important element determining strength of steel. In order to obtain sufficient strength, the lower limit is set to 0.40%, is preferably set to 0.45% or more, and is more preferably set to 0.50% or more. Since the alloying cost of C is low compared to other strengthening elements, if a large, amount of C can be contained, high strength can be obtained at a low alloying cost. However, when C is excessively contained, the ductility and toughness are degraded so that the workability is remarkably degraded. Therefore, the upper limit for the C content is set to 0.75%. The C content is preferably set to 0.67% or less and is more preferably set to 0.65% or less.

Si: 1.00% to 5.00%

Si is an element having deoxidizing action. In addition, since Si is element which significantly suppresses softening of steel after heat treatment, Si is an element effective in improving settling resistance. In order to sufficiently obtain such an, effect, the lower limit is set to 1.00%. The Si content is preferably set to 1.20% or more. Meanwhile, when Si is excessively contained, ductility and toughness of steel are degraded so that workability is remarkably degraded. Therefore, the upper limit for the Si content is set to 5.00%. The Si content is preferably set to 3.50% or less.

Mn: 0.20% to 2.00%

Mn is an element which fixes S in steel as MnS and is effective in enhancing hardenability such that hardness after heat treatment is sufficiently improved. In order to achieve these effects, the Mn content is set to 0.20% or more, is preferably set to 0.25% or more, and is more preferably set to 0.30% or more. Meanwhile, when Mn content exceeds 2.00%, hardness of the base (matrix) increases and steel becomes brittle, so that workability is remarkably degraded. Therefore, the Mn content is set to 2.00% or less. The Mn content is preferably set to 1.50% or less and is more preferably set to 1.20% or less.

P: 0.0001% to 0.0500%

Generally, P is included in steel by 0.0001% or more as impurities. Therefore, the lower limit, is set to 0.0001%. P is an element being segregated in prior austenite grain boundaries and the like, so that steel becomes prominently brittle and workability is remarkably degraded. When the P content exceeds 0.0500%, the adverse influence becomes prominent. Therefore, the upper limit for the P content is set to 0.0500%. The P content is preferably 0.0300% or less, is more preferably set to 0.0200% or less, and is still more preferably set to 0.0150% or less.

S: 0.0001% to 0.0500%

Generally, similar to P, S is also included in steel by 0.0001% or more as impurities. Therefore, the lower limit for the S content is set to 0.0001%. S is an element causing steel to be brittle. Accordingly, it is desirable that the S content is reduced as much as possible. Particularly, when the S content exceeds 0.0500%, the adverse, influence becomes prominent. Therefore, the upper limit for the S content is set to 0.0500%. The amount of S is preferably set to 0.0300% or less, is marc, preferably set to 0.0200% or less, and is still more preferably set to 0.0150% or less.

Cr: 0.50% to 3.50%

Cr is an element effective in improving settling resistance due to its effect of suppressing softening after heat treatment. In order to reliably obtain this effect, the Cr content is set to 0.50% or more, is preferably set to 0.60% or more, and is more preferably set to 0.70% or more. However, Cr is solid-solubilized in iron-based carbide and stabilizes the carbide. Therefore, when there is an excessive amount of Cr, iron-based undissolved carbide increases more than necessary, so that strength after heat treatment is degraded. In this case, settling resistance is degraded, on the contrary. When there is an excessive amount of Cr, ductility is degraded, and the workability is remarkably degraded. From these viewpoint, the Cr content is set to 3.50% or less, is preferably set to 3.00% or less, and is more preferably set to 2.75% or less.

Al: 0.0005% to 0.0500%

Generally. Al is included in steel by 0.0005% or more as impurities. Therefore, the lower limit for the Al content is set to 0.0005%. Al is an element forming oxide such as $Al_2O_3$, such that ductility and toughness of steel are degraded and workability is remarkably degraded. Therefore, the Al content is set to 0.0500% or less. It is desirable that the Al content is reduced as much as possible. The Al content is preferably set to 0.0100% or less.

N: 0.0020% to 0.0100%

N is an element which combines with Al, V, Ti, and/or Nb in steel and forms nitride. This nitride has an effect of refining prior austenite grains. In order to achieve this effect, the N content is set to 0.0020% or more and is preferably set to 0.0030% or more. Meanwhile, when there is an excessive amount of N, the nitride is coarsened. As a result, ductility of steel is degraded and workability is remarkably degraded. Therefore, the N content is set to 0.0100% or less and is preferably set to 0.0070% or less.

Basically, the spring steel wire according to the present embodiment includes the elements described above, and the remainder includes Fe and impurities. However, in order to further improve the characteristics, in place of a part of Fe, at least one of Mo: 0.01% to 2.00%, V: 0.01% to 0.50%, W: 0.01% to 0.50%, Nb: 0.005% to 0.100%, and Ti: 0.001% to 0.100%; and/or at least one of Ca: 0.0002% to 0.0100%, Mg: 0.0002% to 0.0100%, Zr: 0.0005% to 0.1000%, B: 0.0005% to 0.0100%, Cu: 0.05% to 1.00%, and Ni: 0.05% to 3.00% may be contained. However, all of Mo, V, W, Nb Ti, Ca, Mg, Zr, B, Cu, and Ni are not necessarily contained, and their lower limits are 0%.

<At Least One of Mo: 0.01% to 2.00%, V: 0.01% to 0.50%, W: 0.01% to 0.50%, Nb: 0.005% to 0.100%, and 0.001% to 0.100%>

Mo, V, W, Nb, and Ti are elements contributing to improvement of settling resistance by suppressing softening after heat treatment. In order to achieve this effect, the amounts of Mo, V, and W are preferably set to 0.01% or more. The amount of Nb is preferably set to 0.005% or more. In addition, the amount of Ti is preferably set to 0.001% or more. Meanwhile, when there are excessive amounts of these elements, metal carbo nitride increases and strength after heat treatment is degraded. Accordingly, nettling resistance is degraded, on the contrary. In addition, since ductility is degraded, workability is remarkably degraded. Therefore, even in, a case where these elements are contained, it is preferable that the upper limit for the Mo content is set to 2.00%, the upper limit for the V content is set to 0.50% the upper limit for the W content is set to 0.50%, the upper limit for the Nb content is set to 0.100%, and the upper limit for the Ti content is set to 0.100%. It is more preferable that the Mo content ranges from 0.05% to 0.60%, the V content ranges from 0.05% to 0.35%, the W content ranges from 0.05% to 0.35%, the Nb content ranges from 0.005% to 0.050%, and the Ti content ranges from 0.010% to 0.080%.

<At Least One of Ca: 0.0002% to 0.0100%, Mg: 0.0002% to 0.0100%, Zr: 0.0005% to 0.1000%. B: 0.0005% to 0.0100%, Cu: 0.05% to 1.00%, and Ni: 0.05% to 3.00%>

All of Ca. Mg, and Zr are elements having an effect of improving hardness of steel after heat treatment by forming oxide, becoming crystallized nuclei of MnS, causing the MnS to be finely dispersed in a uniform manner, and enhancing hardenability by means of the MnS. In addition, all of B, Cu, and Ni are elements having an effect of improving hardness after heat treatment by being solid-solubilized in steel and enhancing hardenability. In order to exhibit these effects, it is preferable that the lower limits for the amounts of Ca and Mg are set to 0.0002%, the lower limit for the amount of Zr is set to 0.0005% the lower limit for the amount of B is set to 0.0005%, the lower limit for the amount of Cu is set to 0.05%, and the lower limit for the amount of Ni is set to 0.05%. Meanwhile, if the Ca content and the Mg content exceed 0.0100% and if the Zr content exceeds 0.1000%, hard inclusions such as oxide, sulfide, and the like are excessively formed, so that ductility of steel is degraded and workability is remarkably degraded. In addition, when the B content exceeds 0.0100%, when the Cu content exceeds 1.00%, and the Ni content exceeds 3.00%, ductility of steel is degraded and workability is remarkably degraded. Therefore, even in a case where these elements are contained, it is preferable that the upper limits for the Ca content and the Mg content are set to 0.0100%, the upper limit for the Zr content is set to 0.1000%, the upper limit for the B content is set to 0.0100%, the upper limit for the Cu content is set to 1.00%, and the upper limit for the Ni content is set tc 3.00%.

The spring steel wire according to the present embodiment includes a chemical composition containing the essential elements and a remainder including Fe and impurities, or a chemical composition containing the optional elements described above in addition to the essential elements, and a remainder of Fe and impurities. As impurities other than those described above, O and the like are considered, and their amounts are preferably set to 0.05% or less in total.

Next, the reasons for limiting the structure of the spring steel wire according to the present embodiment will be described.

<Tempered Martensite of 90% or More by Area Ratio>

When the structure of the spring steel wire is a structure having tempered martensite as a main constituent, excellent settling resistance can be obtained. As phases other than the tempered martensite (remainder structures), there are ferrite, pearlite, bainite, residual austenite, and the like. When the total area ratio of these structures (remainder structures) increases, settling resistance is degraded. On the contrary, when the remainder structures are further reduced, settling resistance is further improved.

Particularly, when the total area ratio of the remainder structures exceeds 10%, settling resistance, is remarkably degraded. Therefore, the remainder structures are; set to less than 10% by total area ratio. That is, the area ratio of the tempered martensite is regulated to 90% or higher. The residual shear strain amount that is an index value for settling resistance can be set to 0.029% or less by setting the area ratio of the tempered martensite to 90% or more and controlling the prior austenite grain size, the iron-based carbide size, and the distribution state, which will be described below. The area ratio of the tempered martensite may be 100%.

The area ratio of the tempered martensite needs only to be 90% or more by average area ratio when a cross section (C-cross section) of a spring steel wire orthogonal to the length direction after quenching and tempering is observed and image analysis is performed. Actually, for example, as seen in Examples described below, the area ratio of the tempered martensite may be represented by a value measured at a ¼ position of a diameter D from a location on the outer circumferential surface of a steel wire in the C-cross section of the steel wire. For example, the area ratio of martensite may be obtained by collecting a sample from a ¼ portion of the diameter D from the outer circumferential surface in the C-cross section of the steel wire, performing etching using a nital etching solution, capturing five photographs of the structure of 1,000-fold using, an optical microscope, and performing image analysis.

<No. 12.5 or Higher as Prior Austenite Grain Size Number>

When prior austenite grams are refined, the size of martensite blocks is refined. Accordingly, yield strength is improved. As a result, settling resistance is improved. These effects get larger particularly through refinement in which the prior austenite grain size number is No. 12.5 or higher. Therefore, the prior austenite grain size number is set to No. 12.5 or higher. The prior austenite grain size number is preferably set to No. 13.5 or higher, is more preferably set to No. 14.0 or higher, and is still more preferably set to No. 14.5 or higher. Since it is preferable for the prior austenite grain size to be small, there is no need to provide an upper limit for the grain size number.

The prior austenite grain size number needs only to be measured by observing prior austenite grain boundaries which are revealed through etching using an, appropriate etching solution such as a picric acid saturated aqueous solution using an optical microscope or the like. Representatively, the measurement may be performed in accordance with JIS G 0551. In addition, the prior austenite grain size needs only to be measured in a cross section (C-cross section) of a spring steel wire orthogonal to the length direction after quenching and tempering. Actually, for example, as seen in Examples described below, the prior austenite grain size number may be represented by a value measured at a ¼ position of the diameter D from a location on the outer circumferential surface of a steel ire in the C-cross section of the steel wire after quenching and tempering.

<Presence Density of Iron-based Carbide Having Equivalent Circle Diameter Ranging from 0.15 µm to 0.50 µm is 0.40 Pieces/µm$^2$ to 2.00 Pieces/µm$^2$>

In order to refine the prior austenite grains, it is effective to suppress grain growth of austenite before martensite transformation by means of an pinning effect of precipitates. In order to refine austenite before transformation such that the prior austenite grain size number becomes No. 12.5 or higher, without impairing workability, it is effective when precipitates having an equivalent circle diameter ranging from 0.10 µm to 0.50 µm, particularly among thereof, precipitates having an equivalent circle diameter ranging from 0.15 µm to 0.50 µm are present in a dispersed manner at a density ranging from 0.40 pieces/µm$^2$ to 2.00 pieces/µm$^2$.

Here, when the equivalent circle diameter is less than 0.15 µm or exceeds 0.50 µm, or when the presence density of precipitates is less than 0.40 pieces/µm$^2$, the pinning effect of grain growth of austenite is small and sufficient refinement of austenite grains cannot be obtained. Therefore, the effect of improving settling resistance cannot be sufficiently obtained. In accordance with an increase of the presence density of precipitates, the prior austenite grain size number increases and settling resistance are improved. However, when the presence density of precipitates exceeds 2.00 pieces/$\mu m^2$, strength after quenching and tempering is degraded, so that settling resistance is degraded, on the contrary. In addition, since ductility is also degraded, workability is remarkably degraded. Therefore, there is a need for precipitates having an equivalent circle diameter ranging from 0.15 μm to 0.50 μm to be dispersed at a density ranging from 0.40 pieces/$\mu m^2$ to 2.00 pieces/$\mu m^2$.

Furthermore, when there are 0.50 pieces/$\mu m^2$ or more of precipitates having equivalent circle diameters ranging from 0.15 μm to 0.50 μm, the prior austenite grain size number becomes No. 13.5 or higher, which is more preferable.

In order to obtain precipitates having the size and the amount as described above, it is necessary that precipitates is iron-based carbide such as cementite ($Fe_3C$). However, even though precipitates are iron-based carbide, iron-based carbide precipitated during tempering is fine, and the foregoing conditions are not often satisfied. Therefore, it is preferable that iron-based carbide satisfying the foregoing conditions has comparatively large iron-based undissolved carbide as a main constituent which has remained undissolved during heating before quenching. In addition, for example, since nitride and the like are drastically smaller than the size described above, a sufficient pinning effect cannot be obtained compared to iron-based carbide.

As described above, when the spring steel wire according to the present embodiment simultaneously satisfies three conditions, such as the spring steel wire includes, as a structure, by area ratio, a structure of tempered martensite of 90% or more, the prior austenite grain size number is No. 12.5 or higher, and the presence density of iron-based carbide having an equivalent circle diameter ranging from 0.15 μm to 0.50 μm is 40 pieces/$\mu m^2$ to 2.00 pieces/$\mu m^2$ excellent settling resistance can be obtained without impairing workability.

The spring according to the present embodiment includes the spring steel wire according to the present embodiment. Specifically, the spring according to the present embodiment is obtained by carrying out cold coiliing with the spring steel wire according to the present embodiment. Even though coiliing is carried out, there is no change in the chemical composition and the presence state of carbide. Therefore, the chemical composition and the presence state of carbide in the spring according to the present embodiment including the spring steel wire according to the present embodiment are the same as those in the spring steel wire according to the present embodiment.

Next, preferable methods of manufacturing the spring steel wire according to the present embodiment and the spring according to the present embodiment will be described.

The spring steel wire according to the present embodiment can achieve the foregoing effects as long as the spring steel wire has the features described above. Therefore, the manufacturing method is not particularly limited. However, for example, when pearlitic transformation treatment such as lead patenting is performed with respect to a steel wire rod obtained through casting and hot rolling in accordance with the routine procedure, at a temperature higher than a general temperature range (patenting process), then, cold drawing is performed to a predetermined diameter, and thereafter, the heating temperature before quenching is controlled and quenching and tempering are performed (quenching and tempering process), the spring steel wire can be stably obtained, which is preferable.

Hereinafter, preferable conditions for the patenting process and the quenching and tempering process will be described.

<Patenting Process>

Pearlitic transformation treatment such as lead patenting is performed with respect to a steel wire rod obtained through casting and hot rolling. Generally, in consideration of productivity and the like, pearlitic transformation treatment is performed at a temperature (approximately from 550° C. to 600° C.) in the vicinity of a pearlite nose in an isothermal transformation diagram (TTT curve). However, in a case where the spring steel wire according to the present embodiment is manufactured, it is preferable that patenting is performed within a range from 650° C. to 750° C. When the patenting temperature is set to 650° C. or higher, Cr and Mn are concentrated in cementite, so that iron-based carbide is unlikely to be dissolved during quenching and tempering. As a result, the main constituent of iron-based carbide becomes undissolved carbide, so that iron-based carbide having desired size and presence density can be obtained.

<Quenching and Tempering Process>

Quenching and tempering are performed with respect to a steel wire rod which has been subjected to cold drawing to a predetermined diameter after pearlitic transformation treatment such as patenting is performed. In order to realize the structure as described above, it is preferable to appropriately control the heating temperature before quenching. In order to have tempered martensite of 90% or more after quenching and tempering, it is preferable that the heating temperature before quenching is 870° C. or higher.

In addition, in the related art, since undissolved carbide has been considered to cause deterioration of characteristics, the heating temperature before quenching has been set near the temperature at which cementite (iron-based carbide) formed through pearlitic transformation treatment is solid-solubilized completely. However, in the spring steel according to the present embodiment, it is preferable that undissolved carbide remains. In order to satisfy the structure conditions as described above, it is preferable that the heating temperature before quenching is set lower than that in the related art, specifically lower than a temperature at which iron-based carbide is solid-solubilized completely, by a range approximately from 10° C. to 40° C.

The temperature at which iron-based carbide is solid-solubilized completely varies depending on the chemical composition of steel. Therefore, the temperature at which iron-based carbide is solid-solubilized completely can be obtained in advance using a sample having a similar chemical composition, and a temperature lower than the obtained temperature by a range from 10° C. to 40° C. may be set as the heating temperature before quenching.

In addition tempering may be performed under known conditions.

Next, the method of manufacturing the spring according to the present embodiment will be described.

As long as the spring according to the present embodiment is manufactured using the spring steel wire according to the present embodiment obtained as described above, its manufacturing conditions and the like are not particularly limited and need only to follow the routine procedure. For example, after cold spring forming is performed with a spring steel wire which is obtained through quenching and tempering as described above, annealing or nitriding may be performed as necessary.

The present invention will be described below in detail with reference to Examples. These Examples are for describing the technical significance and the effects of the present invention and do not limit the scope of the present invention.

Examples

Pieces of ingot steel melted in converter having compositions indicated as kinds of steel A to Z in Table 1 and kinds of steel AA to AV in Table 2 were continuously cast and were made into 162 mm-square rolling materials via a soaking process and a blooming process as necessary. Thereafter, the rolling materials were heated to 1,150° C. and were made into steel wire rods of ϕ8.0 mm through hot rolling. The steel wire rods were subjected to surface scalping to ϕ7.4 mm and were heated to 950° C. Thereafter, lead patenting treatment was performed at temperatures indicated in Tables 3 and 4. After cold wire-drawing was performed to ϕ4.0 mm, quenching and tempering were performed. The iron-based carbide size and the presence density in each steel wire were changed by varying the heating temperature before quenching within the ranges indicated in Tables 3 to 4. In addition, the structures were changed by adjusting the degree of agitation (0 cm/sec to 50 cm/sec) using a water soluble quenching solution (solution temperature of 40° C.) and varying the cooling rate. Thereafter, tempering was performed for 90 seconds within a temperature range from 430° C. to 500° C. Table 3 and Table 4 shows the conditions for quenching and tempering which are performed with respect to each kind of steel.

TABLE 1

| Kind of steel | Chemical composition (mass %) *Remainder of Fe and impurities ||||||||||
|---|---|---|---|---|---|---|---|---|---|---|
| | C | Si | Mn | P | S | Cr | Al | Mo | V | W | Nb |
| A | 0.61 | 2.75 | 0.89 | 0.003 | 0.004 | 1.32 | 0.0029 | — | — | — | — |
| B | 0.64 | 2.10 | 0.67 | 0.004 | 0.003 | 2.73 | 0.0023 | — | — | — | — |
| C | 0.43 | 1.24 | 0.77 | 0.003 | 0.004 | 2.11 | 0.0041 | 0.57 | — | — | — |
| D | 0.58 | 2.23 | 0.85 | 0.005 | 0.004 | 1.02 | 0.0023 | — | 0.28 | — | — |
| E | 0.61 | 2.08 | 0.92 | 0.003 | 0.005 | 1.23 | 0.0028 | — | — | 0.45 | — |
| F | 0.61 | 1.98 | 0.87 | 0.004 | 0.006 | 1.19 | 0.0019 | — | — | — | 0.042 |
| G | 0.63 | 2.24 | 0.75 | 0.005 | 0.005 | 1.16 | 0.0032 | — | — | — | — |
| H | 0.58 | 3.42 | 0.65 | 0.005 | 0.003 | 1.25 | 0.0031 | 0.15 | 0.12 | — | — |
| I | 0.55 | 2.14 | 1.02 | 0.003 | 0.005 | 0.98 | 0.0024 | 0.17 | — | 0.14 | — |
| J | 0.62 | 2.08 | 0.84 | 0.007 | 0.007 | 1.37 | 0.0010 | 0.18 | — | — | 0.011 |
| K | 0.61 | 2.12 | 1.12 | 0.006 | 0.004 | 1.10 | 0.0021 | 0.21 | — | — | — |
| L | 0.58 | 2.54 | 1.17 | 0.006 | 0.006 | 1.14 | 0.0026 | — | 0.19 | 0.17 | — |
| M | 0.60 | 2.18 | 0.53 | 0.003 | 0.004 | 1.27 | 0.0019 | — | 0.23 | — | 0.023 |
| N | 0.60 | 1.98 | 0.87 | 0.005 | 0.005 | 1.28 | 0.0028 | — | 0.21 | — | — |
| O | 0.57 | 1.94 | 0.83 | 0.005 | 0.005 | 1.31 | 0.0021 | — | — | 0.22 | 0.018 |
| P | 0.58 | 2.31 | 0.95 | 0.004 | 0.003 | 1.34 | 0.0024 | — | — | 0.19 | — |
| Q | 0.57 | 2.12 | 0.91 | 0.006 | 0.005 | 1.27 | 0.0038 | — | — | — | 0.021 |
| R | 0.54 | 2.26 | 0.74 | 0.006 | 0.004 | 1.57 | 0.0023 | — | — | — | — |
| S | 0.61 | 2.06 | 0.93 | 0.005 | 0.004 | 1.97 | 0.0037 | — | — | — | — |
| T | 0.63 | 2.00 | 0.86 | 0.005 | 0.003 | 1.43 | 0.0011 | — | — | — | — |
| U | 0.58 | 2.08 | 0.76 | 0.005 | 0.006 | 1.19 | 0.0020 | — | — | — | — |
| V | 0.59 | 2.18 | 0.94 | 0.006 | 0.004 | 1.27 | 0.0033 | — | — | — | — |
| W | 0.60 | 1.97 | 1.12 | 0.006 | 0.005 | 0.75 | 0.0028 | — | — | — | — |
| X | 0.59 | 1.91 | 0.94 | 0.004 | 0.003 | 1.35 | 0.0022 | — | — | — | — |
| Y | 0.60 | 2.23 | 0.78 | 0.005 | 0.006 | 1.34 | 0.0032 | — | — | — | — |
| Z | 0.61 | 2.37 | 0.88 | 0.005 | 0.005 | 1.21 | 0.0038 | — | — | — | — |

| Kind of steel | Chemical composition (mass %) *Remainder of Fe and impurities |||||||| 
|---|---|---|---|---|---|---|---|---|
| | Ti | Ca | Mg | Zr | B | Cu | Ni | N |
| A | — | — | — | — | — | — | — | 0.0045 |
| B | — | — | — | — | — | — | — | 0.0052 |
| C | — | — | — | — | — | — | — | 0.0040 |
| D | — | — | — | — | — | — | — | 0.0069 |
| E | — | — | — | — | — | — | — | 0.0032 |
| F | — | — | — | — | — | — | — | 0.0057 |
| G | 0.04 | — | — | — | — | — | — | 0.0056 |
| H | — | — | — | — | — | — | — | 0.0064 |
| I | — | — | — | — | — | — | — | 0.0041 |
| J | — | — | — | — | — | — | — | 0.0048 |
| K | 0.05 | — | — | — | — | — | — | 0.0058 |
| L | — | — | — | — | — | — | — | 0.0046 |
| M | — | — | — | — | — | — | — | 0.0046 |
| N | 0.05 | — | — | — | — | — | — | 0.0042 |
| O | — | — | — | — | — | — | — | 0.0058 |
| P | 0.04 | — | — | — | — | — | — | 0.0061 |
| Q | 0.06 | — | — | — | — | — | — | 0.0052 |
| R | — | 0.0012 | — | — | — | — | — | 0.0037 |
| S | — | — | 0.0011 | — | — | — | — | 0.0042 |
| T | — | — | — | 0.0027 | — | — | — | 0.0051 |
| U | — | — | — | — | 0.0022 | — | — | 0.0054 |
| V | — | — | — | — | — | 0.12 | 0.27 | 0.0043 |
| W | — | 0.0031 | 0.0022 | — | — | — | — | 0.0037 |

TABLE 1-continued

|   |   |        |   |        |        |      |      |        |
|---|---|--------|---|--------|--------|------|------|--------|
| X | — | 0.0018 | — | 0.0021 | —      | —    | —    | 0.0061 |
| Y | — | 0.0024 | — | —      | 0.0034 | —    | —    | 0.0038 |
| Z | — | 0.0028 | — | —      | —      | 0.18 | 0.21 | 0.0054 |

TABLE 2

| Kind of steel | Chemical composition (mass %) *Remainder of Fe and impurities ||||||||||
|---|---|---|---|---|---|---|---|---|---|---|
| | C | Si | Mn | P | S | Cr | Al | Mo | V | W | Nb |
| AA | 0.54 | 2.34 | 0.72 | 0.003 | 0.004 | 1.52 | 0.0017 | — | — | — | — |
| AB | 0.57 | 2.11 | 0.94 | 0.004 | 0.006 | 1.08 | 0.0022 | — | — | — | — |
| AC | 0.59 | 1.95 | 0.87 | 0.006 | 0.005 | 1.24 | 0.0040 | — | — | — | — |
| AD | 0.62 | 2.07 | 1.03 | 0.006 | 0.004 | 1.28 | 0.0034 | — | — | — | — |
| AE | 0.61 | 2.16 | 0.94 | 0.007 | 0.003 | 1.34 | 0.0028 | — | — | — | — |
| AF | 0.59 | 2.07 | 0.87 | 0.003 | 0.006 | 1.02 | 0.0029 | — | — | — | — |
| AG | 0.62 | 2.17 | 0.98 | 0.005 | 0.005 | 1.24 | 0.0019 | — | — | — | — |
| AH | 0.60 | 2.40 | 0.75 | 0.004 | 0.003 | 1.15 | 0.0042 | 0.12 | — | — | — |
| AI | 0.62 | 1.94 | 1.18 | 0.003 | 0.006 | 0.94 | 0.0033 | — | 0.25 | — | — |
| AJ | 0.54 | 1.87 | 0.74 | 0.007 | 0.003 | 1.25 | 0.0011 | — | — | 0.16 | — |
| AK | 0.58 | 2.23 | 0.62 | 0.005 | 0.005 | 1.31 | 0.0020 | — | — | — | 0.017 |
| AL | 0.58 | 2.06 | 0.97 | 0.003 | 0.005 | 0.87 | 0.0017 | 0.22 | 0.15 | — | — |
| AM | 0.75 | 2.21 | 0.86 | 0.006 | 0.004 | 1.21 | 0.0012 | — | — | — | — |
| AN | 0.59 | 2.32 | 0.81 | 0.005 | 0.003 | 3.48 | 0.0018 | — | — | — | — |
| AO | 0.58 | 1.03 | 0.84 | 0.006 | 0.005 | 1.05 | 0.0020 | — | — | — | — |
| AP | 0.60 | 4.97 | 0.84 | 0.005 | 0.004 | 1.30 | 0.0026 | — | — | — | — |
| AQ | 0.58 | 2.17 | 0.21 | 0.006 | 0.005 | 1.25 | 0.0023 | — | — | — | — |
| AR | 0.59 | 2.22 | 0.80 | 0.005 | 0.004 | 0.51 | 0.0017 | — | — | — | — |
| AS | 0.59 | 2.14 | 0.83 | 0.005 | 0.004 | 1.32 | 0.0495 | — | — | — | — |
| AT | 0.58 | 2.08 | 0.83 | 0.004 | 0.005 | 1.28 | 0.0025 | — | — | — | — |
| AU | 0.60 | 2.26 | 1.98 | 0.005 | 0.006 | 1.18 | 0.0028 | — | — | — | — |
| AV | 0.59 | 2.17 | 0.87 | 0.005 | 0.004 | 4.02 | 0.0015 | — | — | — | — |

| Kind of steel | Chemical composition (mass %) *Remainder of Fe and impurities |||||||| 
|---|---|---|---|---|---|---|---|---|
| | Ti | Ca | Mg | Zr | B | Cu | Ni | N |
| AA | — | — | 0.0013 | 0.0014 | — | — | — | 0.0052 |
| AB | — | — | 0.0018 | — | 0.0041 | — | — | 0.0049 |
| AC | — | — | 0.0021 | — | — | 0.23 | 0.54 | 0.0034 |
| AD | — | — | — | 0.0048 | 0.0028 | — | — | 0.0046 |
| AE | — | — | — | 0.0024 | — | 0.31 | 0.37 | 0.0054 |
| AF | — | — | — | — | 0.0031 | 0.27 | 0.44 | 0.0046 |
| AG | — | 0.0016 | 0.0018 | 0.0031 | — | — | — | 0.0032 |
| AH | — | 0.0021 | — | 0.0057 | 0.0025 | — | — | 0.0067 |
| AI | — | 0.0025 | 0.0009 | — | — | 0.28 | 0.52 | 0.0054 |
| AJ | — | — | 0.0014 | 0.0016 | — | — | — | 0.0040 |
| AK | — | — | — | 0.0018 | 0.0038 | — | — | 0.0048 |
| AL | — | 0.0014 | — | — | — | — | — | 0.0044 |
| AM | — | — | — | — | — | — | — | 0.0052 |
| AN | — | — | — | — | — | — | — | 0.0054 |
| AO | — | — | — | — | — | — | — | 0.0046 |
| AP | — | — | — | — | — | — | — | 0.0060 |
| AQ | — | — | — | — | — | — | — | 0.0057 |
| AR | — | — | — | — | — | — | — | 0.0055 |
| AS | — | — | — | — | — | — | — | 0.0047 |
| AT | — | — | — | — | — | — | — | 0.0097 |
| AU | — | — | — | — | — | — | — | 0.0054 |
| AV | — | — | — | — | — | — | — | 0.0049 |

TABLE 3

| | | Quenching and tempering conditions | | | | |
|---|---|---|---|---|---|---|
| Test No. | Kind of steel | Patenting conditions Temperature (° C.) | Heating temperature (° C.) | Agitation of quenching solution (cm/sec) | Tempering temperature (° C.) | Temperature for complete solid-solution of cementite (° C.) |
| 1 | A | 710 | 890 | 50 | 455 | 920 |
| 2 | B | 710 | 940 | 50 | 475 | 970 |
| 3 | C | 710 | 910 | 50 | 455 | 940 |
| 4 | D | 710 | 880 | 50 | 455 | 910 |
| 5 | E | 710 | 890 | 50 | 450 | 920 |
| 6 | F | 710 | 890 | 50 | 440 | 920 |
| 7 | G | 710 | 890 | 50 | 440 | 920 |
| 8 | H | 710 | 890 | 50 | 480 | 920 |
| 9 | I | 710 | 880 | 50 | 445 | 910 |
| 10 | J | 710 | 895 | 50 | 450 | 925 |
| 11 | K | 710 | 880 | 50 | 450 | 910 |
| 12 | L | 710 | 890 | 50 | 465 | 920 |
| 13 | M | 710 | 890 | 50 | 455 | 920 |
| 14 | N | 710 | 890 | 50 | 455 | 920 |
| 15 | O | 710 | 895 | 50 | 440 | 925 |
| 16 | P | 710 | 890 | 50 | 445 | 920 |
| 17 | Q | 710 | 890 | 50 | 440 | 920 |
| 18 | R | 710 | 900 | 50 | 445 | 930 |
| 19 | S | 710 | 910 | 50 | 455 | 940 |
| 20 | T | 710 | 895 | 50 | 445 | 925 |
| 21 | U | 710 | 890 | 50 | 435 | 920 |
| 22 | V | 710 | 890 | 50 | 440 | 920 |
| 23 | W | 710 | 880 | 50 | 430 | 910 |
| 24 | X | 710 | 895 | 50 | 440 | 925 |
| 25 | Y | 710 | 890 | 50 | 445 | 920 |
| 26 | Z | 710 | 890 | 50 | 445 | 920 |
| 27 | AA | 710 | 900 | 50 | 445 | 930 |
| 28 | AB | 710 | 885 | 50 | 435 | 915 |
| 29 | AC | 710 | 890 | 50 | 435 | 920 |
| 30 | AD | 710 | 890 | 50 | 445 | 920 |
| 31 | AE | 710 | 890 | 50 | 445 | 920 |
| 32 | AF | 710 | 885 | 50 | 435 | 915 |
| 33 | AG | 710 | 890 | 50 | 445 | 920 |

TABLE 4

| | | Quenching and tempering conditions | | | | |
|---|---|---|---|---|---|---|
| Test No. | Kind of steel | Patenting conditions Temperature (° C.) | Heating temperature (° C.) | Agitation of quenching solution (cm/sec) | Tempering temperature (° C.) | Temperature for complete solid-solution of cementite (° C.) |
| 34 | AH | 710 | 885 | 50 | 450 | 915 |
| 35 | AI | 710 | 880 | 50 | 450 | 910 |
| 36 | AJ | 710 | 890 | 50 | 435 | 920 |
| 37 | AK | 710 | 895 | 50 | 440 | 925 |
| 38 | AL | 710 | 880 | 50 | 450 | 910 |
| 39 | AM | 710 | 890 | 50 | 445 | 920 |
| 40 | AN | 710 | 970 | 50 | 490 | 1000 |
| 41 | AO | 710 | 885 | 50 | 430 | 915 |
| 42 | AP | 710 | 890 | 50 | 490 | 920 |
| 43 | AQ | 710 | 890 | 50 | 440 | 920 |
| 44 | AR | 710 | 875 | 50 | 435 | 905 |
| 45 | AS | 710 | 890 | 50 | 445 | 920 |
| 46 | AT | 710 | 890 | 50 | 440 | 920 |
| 47 | AU | 710 | 890 | 50 | 445 | 920 |
| 48 | AV | 710 | 1010 | 50 | 500 | 1040 |
| 49 | A | 630 | 890 | 50 | 455 | 900 |
| 50 | A | 710 | 890 | 0 | 455 | 920 |
| 51 | H | 710 | 890 | 0 | 480 | 920 |
| 52 | M | 710 | 890 | 0 | 455 | 920 |
| 53 | W | 710 | 885 | 0 | 430 | 910 |
| 54 | AK | 710 | 895 | 0 | 440 | 925 |
| 55 | B | 710 | 970 | 50 | 475 | 970 |
| 56 | C | 710 | 935 | 50 | 455 | 940 |
| 57 | I | 710 | 905 | 50 | 445 | 910 |
| 58 | AA | 710 | 925 | 50 | 445 | 930 |
| 59 | AH | 710 | 910 | 50 | 450 | 915 |

TABLE 4-continued

| | | Quenching and tempering conditions | | | | |
|---|---|---|---|---|---|---|
| Test No. | Kind of steel | Patenting conditions Temperature (° C.) | Heating temperature (° C.) | Agitation of quenching solution (cm/sec) | Tempering temperature (° C.) | Temperature for complete solid-solution of cementite (° C.) |
| 60 | A | 710 | 875 | 50 | 455 | 920 |
| 61 | H | 710 | 870 | 50 | 480 | 920 |
| 62 | M | 710 | 870 | 50 | 455 | 920 |
| 63 | W | 710 | 875 | 50 | 430 | 910 |
| 64 | AK | 710 | 870 | 50 | 440 | 925 |

A sample was collected from a ¼ portion of the diameter D from the outer circumferential surface in the C-cross section of each of the quenched and tempered steel wires, and etching was performed using a nital etching solution. Then, ten photographs of the structure of 10,000-fold were captured using an electronic scanning microscope, and the presence density of iron-based carbide having an equivalent circle diameter ranging from 0.15 μm to 0.50 μm was obtained through image analysis (Luzex). In addition, five photographs of the structure of 1,000-fold were captured using an optical microscope, and the area ratio of martensite was obtained through image analysis (Luzex). The prior austenite grain size was measured by performing etching with a picric acid saturated aqueous solution in accordance with JIS G 0551 causing prior austenite grain boundaries to be revealed, and observing the result using an optical microscope. JIS No. 2 tensile test pieces were prepared using the quenched and tempered steel wires, and tensile tests were executed in accordance with JIS Z 2241 and tensile strength, yield strength and reduction in area were measured.

In addition, after the quenched and tempered steel wires were subjected to cold spring forming (coil having an average diameter of 20.2 mm, and effective number of winding of 5.0), annealing treatment was performed at 400° C. for 30 min. Both ends were subjected to end polishing, and shot-peening treatment was performed. Thereafter, low-temperature annealing treatment was performed at 230° C. for 20 min. Lastly, cold setting was performed, and springs for settling resistance evaluation were prepared. The springs prepared under the conditions described above were heated to 120° C.' and were fastened at 1,300 MPa for 50 hours. Thereafter, the residual shear strain amounts were measured in order to evaluate the settling resistance. A spring having a residual shear strain amount of 0.029% or less was evaluated as a spring having excellent settling resistance.

Figure 1:
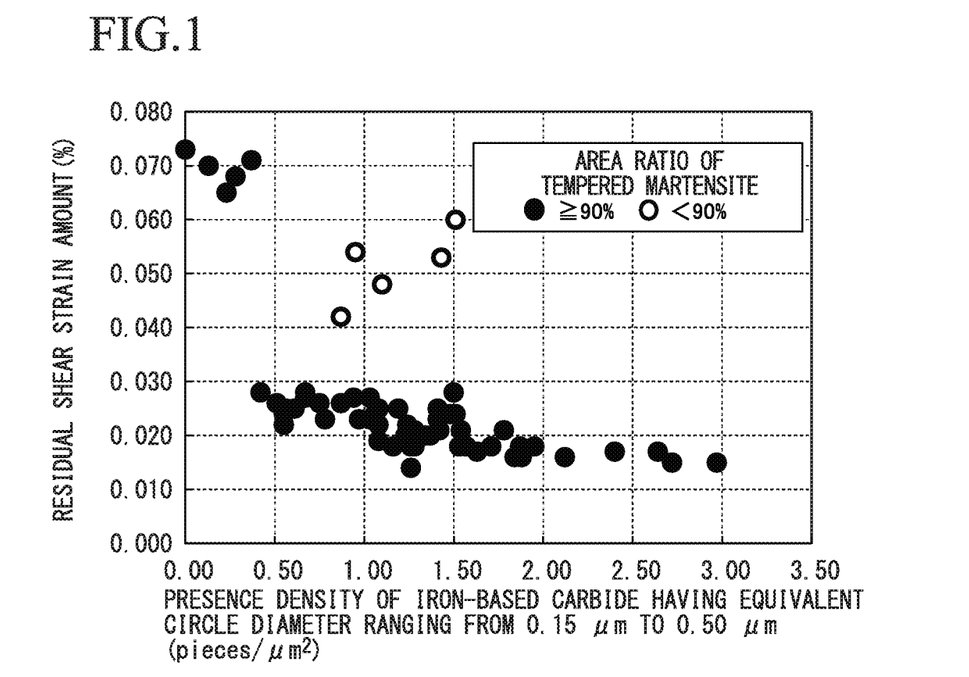
FIG. 1 is a graph showing a relationship between presence density of iron-based carbide having an equivalent circle diameter ranging from 0.15 μm to 0.50 μm, and a residual shear strain amount which is an index for settling resistance.
Figure 2:
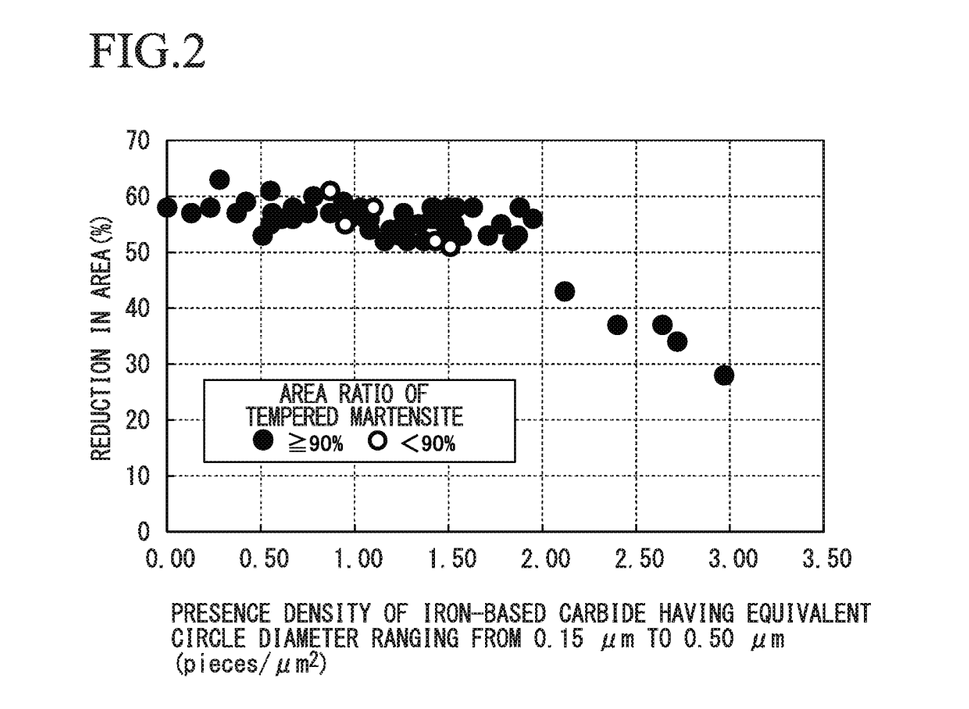
FIG. 2 is a graph showing a relationship between presence density of iron-based carbide having an equivalent circle diameter ranging from 0.15 μm to 0.50 μm, and reduction in area which is an index for workability.

Table 5 and Table 6 indicate the area ratio of the tempered martensite, the prior austenite grain size number, the presence density of iron-based carbide having an equivalent circle diameter ranging from 0.15 μm to 0.50 μm, and the results of the tensile tests and the settling resistance evaluation tests. The remainder structure was at least one of ferrite, pearlite, bainite, and residual austenite. In addition, based on, the results, FIG. 1 shows a relationship between the presence density of iron-based carbide having an equivalent circle diameter ranging from 0.15 μm to 0.50 μm and the residual shear strain amount, and FIG. 2 shows a relationship between the presence density of iron-based carbide having an equivalent circle diameter ranging from 0.15 μm to 0.50 μm and a reduction in area.

TABLE 5

| Test No. | classification | Area ratio of tempered martensite (%) | Prior austenite grain size number | Presence density of iron-based carbide having equivalent circle diameter ranging from 0.15 μm to 0.50 μm (pieces/μm²) | Tensile strength (MPa) | Yield strength (MPa) | Reduction in area (%) | Residual shear strain amount (%) |
|---|---|---|---|---|---|---|---|---|
| 1 | Examples of | 92 | 13.7 | 0.56 | 2253 | 2031 | 57 | 0.025 |
| 2 | Invention | 91 | 14.0 | 0.97 | 2232 | 2021 | 56 | 0.023 |
| 3 | | 97 | 15.1 | 1.95 | 2248 | 2045 | 56 | 0.018 |
| 4 | | 94 | 14.1 | 1.03 | 2249 | 2034 | 58 | 0.027 |
| 5 | | 93 | 14.6 | 1.53 | 2221 | 2018 | 55 | 0.018 |
| 6 | | 91 | 15.1 | 1.87 | 2263 | 2059 | 53 | 0.018 |
| 7 | | 91 | 14.3 | 1.51 | 2255 | 2042 | 52 | 0.024 |
| 8 | | 94 | 14.0 | 0.42 | 2210 | 2007 | 59 | 0.028 |
| 9 | | 93 | 14.5 | 1.24 | 2219 | 2008 | 53 | 0.022 |
| 10 | | 92 | 13.8 | 0.75 | 2237 | 2017 | 57 | 0.026 |
| 11 | | 93 | 14.6 | 1.50 | 2204 | 2001 | 58 | 0.028 |
| 12 | | 92 | 14.2 | 1.34 | 2241 | 2024 | 55 | 0.020 |
| 13 | | 95 | 14.1 | 1.57 | 2230 | 2013 | 53 | 0.018 |
| 14 | | 92 | 14.2 | 0.78 | 2267 | 2047 | 60 | 0.023 |
| 15 | | 92 | 14.6 | 1.71 | 2254 | 2041 | 53 | 0.018 |
| 16 | | 94 | 13.7 | 0.55 | 2234 | 2012 | 61 | 0.024 |
| 17 | | 95 | 14.8 | 1.43 | 2239 | 2034 | 56 | 0.024 |
| 18 | | 92 | 14.3 | 1.16 | 2263 | 2053 | 52 | 0.018 |
| 19 | | 93 | 14.7 | 1.63 | 2231 | 2020 | 58 | 0.017 |
| 20 | | 91 | 14.3 | 1.41 | 2220 | 2007 | 58 | 0.025 |
| 21 | | 94 | 14.5 | 1.26 | 2269 | 2059 | 57 | 0.018 |
| 22 | | 93 | 14.1 | 1.08 | 2254 | 2038 | 56 | 0.022 |

TABLE 5-continued

| Test No. | classification | Area ratio of tempered martensite (%) | Prior austenite grain size number | Presence density of iron-based carbide having equivalent circle diameter ranging from 0.15 μm to 0.50 μm (pieces/μm$^2$) | Tensile strength (MPa) | Yield strength (MPa) | Reduction in area (%) | Residual shear strain amount (%) |
|---|---|---|---|---|---|---|---|---|
| 23 | | 95 | 14.5 | 1.54 | 2208 | 1994 | 58 | 0.021 |
| 24 | | 93 | 14.8 | 1.78 | 2214 | 2010 | 55 | 0.021 |
| 25 | | 93 | 13.9 | 0.87 | 2231 | 2014 | 57 | 0.026 |
| 26 | | 92 | 14.4 | 1.19 | 2258 | 2046 | 54 | 0.025 |
| 27 | | 94 | 14.5 | 1.41 | 2262 | 2049 | 56 | 0.023 |
| 28 | | 93 | 14.6 | 1.37 | 2241 | 2029 | 52 | 0.020 |
| 29 | | 93 | 13.8 | 0.67 | 2227 | 2008 | 58 | 0.028 |
| 30 | | 94 | 14.6 | 1.08 | 2260 | 2043 | 54 | 0.019 |
| 31 | | 92 | 14.0 | 1.28 | 2250 | 2034 | 52 | 0.021 |
| 32 | | 93 | 13.8 | 0.67 | 2271 | 2047 | 56 | 0.027 |
| 33 | | 92 | 14.8 | 1.84 | 2247 | 2043 | 52 | 0.016 |
| 34 | | 95 | 14.2 | 1.48 | 2271 | 2064 | 55 | 0.024 |
| 35 | | 93 | 14.2 | 1.08 | 2258 | 2044 | 54 | 0.025 |

TABLE 6

| Test No. | classification | Area ratio of tempered martensite (%) | Prior austenite grain size number | Presence density of iron-based carbide having equivalent circle diameter ranging from 0.15 μm to 0.50 μm (pieces/μm$^2$) | Tensile strength (MPa) | Yield strength (MPa) | Reduction in area (%) | Residual shear strain amount (%) |
|---|---|---|---|---|---|---|---|---|
| 36 | Examples of | 92 | 14.4 | 1.42 | 2239 | 2027 | 58 | 0.021 |
| 37 | Invention | 92 | 14.2 | 0.94 | 2224 | 2011 | 59 | 0.027 |
| 38 | | 91 | 14.6 | 1.04 | 2256 | 2050 | 57 | 0.023 |
| 39 | | 91 | 14.2 | 1.06 | 2222 | 2010 | 56 | 0.024 |
| 40 | | 92 | 14.0 | 1.03 | 2228 | 2014 | 58 | 0.023 |
| 41 | | 96 | 14.9 | 1.88 | 2252 | 2033 | 58 | 0.016 |
| 42 | | 94 | 14.2 | 0.51 | 2233 | 2022 | 53 | 0.026 |
| 43 | | 95 | 13.9 | 0.55 | 2241 | 2038 | 55 | 0.022 |
| 44 | | 92 | 14.1 | 1.23 | 2245 | 2029 | 54 | 0.020 |
| 45 | | 93 | 13.7 | 0.61 | 2238 | 2017 | 56 | 0.025 |
| 46 | | 95 | 14.3 | 1.28 | 2249 | 2034 | 52 | 0.018 |
| 47 | | 94 | 14.5 | 1.26 | 2238 | 2026 | 55 | 0.014 |
| 48 | Comparative | 92 | <u>11.7</u> | 1.48 | 2220 | 1905 | 53 | 0.066 |
| 49 | Examples | 93 | <u>11.0</u> | <u>0.08</u> | 2238 | 1924 | 60 | 0.075 |
| 50 | | <u>88</u> | 13.7 | 0.87 | 2209 | 1951 | 61 | 0.042 |
| 51 | | <u>85</u> | 14.2 | 0.95 | 2227 | 1944 | 55 | 0.054 |
| 52 | | <u>82</u> | 14.5 | 1.51 | 2156 | 1874 | 51 | 0.060 |
| 53 | | <u>87</u> | 13.8 | 1.10 | 2184 | 1899 | 58 | 0.048 |
| 54 | | <u>81</u> | 14.4 | 1.43 | 2176 | 1843 | 52 | 0.053 |
| 55 | | 91 | <u>11.0</u> | <u>0.00</u> | 2287 | 1933 | 58 | 0.073 |
| 56 | | 97 | <u>12.1</u> | <u>0.37</u> | 2253 | 1950 | 57 | 0.071 |
| 57 | | 94 | <u>11.5</u> | <u>0.23</u> | 2223 | 1901 | 58 | 0.065 |
| 58 | | 92 | <u>11.3</u> | <u>0.13</u> | 2267 | 1935 | 57 | 0.070 |
| 59 | | 92 | <u>11.4</u> | <u>0.28</u> | 2217 | 1942 | 63 | 0.068 |
| 60 | | 94 | 14.3 | <u>2.12</u> | 2264 | 2037 | 43 | 0.016 |
| 61 | | 92 | 15.0 | <u>2.97</u> | 2211 | 2027 | 28 | 0.015 |
| 62 | | 95 | 14.8 | <u>2.64</u> | 2220 | 2023 | 37 | 0.017 |
| 63 | | 94 | 14.8 | <u>2.40</u> | 2197 | 1981 | 37 | 0.017 |
| 64 | | 92 | 14.9 | <u>2.72</u> | 2204 | 2014 | 34 | 0.015 |

As is clear from Table 5 and Table 6, the test No. 1 to 47 were Examples of the present invention satisfying the requirements regulated in the present invention. In these examples, it had been found that excellent settling resistance such as the residual shear strain amount of 0.029% or less were obtained while workability of reduction in area of 50% or more was maintained.

In contrast, in the test No. 48 to 64 which were Comparative Examples, either workability or settling resistance was not sufficient.

In the test No. 50 to 54, the prior austenite grain size or the presence density of iron-based carbide satisfied the range of the regulation of the present invention. However, since the area ratio of the tempered martensite was less than 90%, the residual shear strain amount was large and the settling resistance, was low.

In addition, in the test No. 48, the prior austenite grain size number was less than 12.5. As a result, the residual shear strain amount was large and the settling resistance was low.

In addition, in the test No. 49 and 55 to 59, the area ratio of the tempered martensite satisfied the range of the regulation of the present invention. However, since the prior austenite grain size number was less than 12.5, the presence density of iron-based carbide having an equivalent circle diameter ranging from 0.15 μm to 0.50 μm was less than 0.40 pieces/μm. As a result, the residual shear strain amount was large and the settling resistance was low.

Furthermore in the test No. 60 to 64, the area ratio of the tempered martensite and the prior austenite grain size satisfied the range of the regulation of the present invention. However, the presence density of iron-based carbide having an equivalent circle diameter ranging from 0.15 μm to 0.50 μm exceeded 2.00 pieces/μm$^2$. As a result, the reduction in area, that is, the workability was low.

Accordingly, from Examples described above it is clear that while favorable workability is maintained, excellent settling resistance can be ensured by satisfying the conditions regulated in the present invention, particularly the structure conditions.

Hereinabove, a preferable embodiment and Examples of the present invention, have been described. Each of the embodiment and Examples is merely an example within the scope of the gist of the present invention, and addition, replacement and other changes of the configuration can be made within a range not departing from the gist of the present invention. That is, the present invention is not limited by the description above and is only limited by the accompanying Claims. Naturally, the present invention can be suitably changed within the scope thereof.

INDUSTRIAL APPLICABILITY

According to the present invention, it is possible to provide a high strength spring steel wire having excellent settling resistance after coiliing while favorable workability is ensured, and a spring including the spring steel wire.

What is claimed is:

1. A spring steel wire comprising, by mass %,
C: 0.40% to 0.75%,
Si: 1.00% to 5.00%,
Mn: 0.20% to 2.00%,
P: 0.0001% to 0.0500%,
S: 0.0001% to 0.0500%,
Cr: 0.50% to 3.50%,
Al: 0.0005% to 0.0500%,
N: 0.0020% to 0.0100%,
Mo: 0% to 2.00%,
V: 0% to 0.50%,
W: 0% to 0.50%,
Nb: 0% to 0.100%,
Ti: 0% to 0.100%,
Ca: 0% to 0.0100%,
Mg: 0% to 0.0100%,
Zr: 0% to 0.1000%,
B: 0% to 0.0100%,
Cu: 0% to 1.00%,
Ni: 0% to 3.00%, and
a remainder of Fe and impurities,
wherein a structure includes, by area ratio, a tempered martensite of 90% or more,
wherein a prior austenite grain size number is No. 13.5 or higher, and
wherein a presence density of iron-based carbide having an equivalent circle diameter ranging from 0.15 μm to 0.50 μm is 1.03 pieces/μm$^2$ to 2.00 pieces/μm$^2$.

2. The spring steel wire according to claim 1,
wherein the spring steel wire includes, by mass %, at least one of
Mo: 0.01% to 2.00%,
V: 0.01% to 0.50%,
W: 0.01% to 0.50%,
Nb: 0.005% to 0.100%, and
Ti: 0.001% to 0.100%.

3. A spring including the spring steel wire according to claim 2.

4. The spring steel wire according to claim 2,
wherein the spring steel wire includes, by mass %, at least one of
Ca: 0.0002% to 0.0100%,
Mg: 0.0002% to 0.0100%,
Zr: 0.0005% to 0.1000%,
B: 0.0005% to 0.0100%,
Cu: 0.05% to 1.00%, and
Ni: 0.05% to 3.00%.

5. A spring including the spring steel wire according to claim 4.

6. The spring steel wire according to claim 1,
wherein the spring steel wire includes, by mass %, at least one of
Ca: 0.0002% to 0.0100%,
Mg: 0.0002% to 0.0100%,
Zr: 0.0005% to 0.1000%,
B: 0.0005% to 0.0100%,
Cu: 0.05% to 1.00%, and
Ni: 0.05% to 3.00%.

7. A spring including the spring steel wire according to claim 6.

8. A spring including the spring steel wire according to claim 1.

* * * * *